United States Patent [19]

Strombeck et al.

[11] Patent Number: 5,605,129
[45] Date of Patent: Feb. 25, 1997

[54] ELECTRICALLY CONTROLLED ACTUATOR APPARATUS AND METHOD

[75] Inventors: David W. Strombeck, Plymouth; Michael C. Miller, Coon Rapids, both of Minn.

[73] Assignee: Onan Corporation, Minneapolis, Minn.

[21] Appl. No.: 346,534

[22] Filed: Nov. 29, 1994

[51] Int. Cl.⁶ .................................................. F02D 41/00
[52] U.S. Cl. ...................... 123/361; 251/129.11; 335/272
[58] Field of Search ................................... 123/361, 399; 251/129.11; 335/272

[56] References Cited

U.S. PATENT DOCUMENTS

| | | |
|---|---|---|
| 2,143,153 | 1/1939 | Hunt . |
| 2,762,000 | 9/1956 | Matthews . |
| 2,872,627 | 2/1959 | Buchtenkirch . |
| 2,879,047 | 3/1959 | Wagner . |
| 3,072,830 | 1/1963 | Lazzarini . |
| 3,183,418 | 5/1965 | Cherniak . |
| 3,221,191 | 11/1965 | Cuches et al. . |
| 3,229,171 | 1/1966 | Daugherty ............................ 335/272 |
| 3,435,394 | 3/1969 | Egger . |
| 4,093,931 | 6/1978 | Fenton . |
| 4,131,099 | 12/1978 | Wessel et al. . |
| 4,169,437 | 10/1979 | Fleischer ................................ 123/361 |
| 4,339,737 | 7/1982 | Meyers et al. . |
| 4,541,378 | 9/1985 | Kitamura . |
| 4,747,380 | 5/1988 | Ejiri et al. . |
| 4,779,592 | 10/1988 | Takeuchi et al. . |
| 4,787,353 | 11/1988 | Ishikawa et al. . |
| 4,909,213 | 3/1990 | Mezger et al. . |
| 5,113,824 | 5/1992 | Haubner ............................... 123/399 |

FOREIGN PATENT DOCUMENTS

| | | | |
|---|---|---|---|
| 0028467 | 5/1981 | European Pat. Off. ............... 335/272 |
| 681942 | 5/1930 | France .................................. 335/272 |
| 907552 | 7/1949 | Germany ............................. 335/272 |
| 2320627 | 9/1976 | Germany . | |
| 174902 | 12/1952 | Netherlands ......................... 335/272 |

OTHER PUBLICATIONS

Paper entitled *Gebrauchsmasteranmeldung Drehmagnet*, printed Oct. 23, 1961 by Fred Hahn.
"Carburetors Feature Integrated Governor" from *Diesel Progress Engines & Drives* .

*Primary Examiner*—Noah P. Kamen
*Attorney, Agent, or Firm*—Merchant, Gould, Smith, Edell, Welter & Schmidt, P.A.

[57] ABSTRACT

An electrically controlled actuator includes a rotor detachably mounted on a rotating shaft, and a stator disposed around the rotor. A fluid flow plate is mounted on the rotating shaft and opens/closes a fluid passageway. A spiral spring is mounted on one end of the rotating shaft. When the rotor is rotated, the fluid flow plate regulates a fluid flow in the fluid passageway. An electrical control current is received in the actuator and is converted to a magnetic torque to rotate the rotor, while the spiral spring is increased in tension. The spiral spring opposes the rotation of the rotor so as to control the position of the fluid flow plate. The rotor includes two symmetric tips extended from two curved outer surfaces at two leading edges of the rotor. An air gap is defined between the inner surfaces of the stator and the outer surfaces of the rotor. The air gap becomes narrower when the rotor is rotated into a space between two poles of the stator.

29 Claims, 12 Drawing Sheets

ELECTRICALLY CONTROLLED ACTUATOR APPARATUS AND METHOD

FIELD OF THE INVENTION

The present invention relates to a fluid flow metering device, more particularly, to an electrically controlled actuator which is integrated into a valve body, such as a carburetor body or a throttle body of an internal combustion engine or the like applications.

BACKGROUND OF THE INVENTION

In an internal combustion engine, an engine running speed is often varied due to the changes of output loads. One of the goals is to maintain a constant engine speed during the change of the load. Another goal is to adjust an engine speed when it is desired. The speed adjustment allows lower speed operation at light engine loads and higher speed operation at greater engine loads. Thus, a quiet operation with a light engine horsepower demand is allowed.

To achieve these goals, an electrically controlled actuator is often used to maintain the engine speed or adjust the engine speed via regulating the amount of the engine combustion fluid, such as air/fuel mixture. An electrical control current is sent to an electrically controlled actuator which converts the electrical control current to magnetic torques so as to actuate the electrically controlled actuator. The actuator then regulates the ratio of fuel/air mixture in a carburetor, or regulates the amount of air in a throttle body, or controls the amount of fluid in the other types of fluid flow metering devices. The change of the fuel/air mixture ratio or the change of the amount of air causes the engine to maintain its running speed or adjust its running speed.

The electrical control current sent to the actuator is usually generated by a microprocessor or digital/analog control methods. The microprocessor generates the electrical control current according to an output of an engine speed sensor. The sensed signal is sent to the microprocessor where calculations are made to correct errors of the air/fuel mixture ratio of a carburetor, or errors of the air amount of a throttle body, or errors of the fluid amount of the other types of fluid flow metering devices. The errors are used to determine whether the electrical control current sent to the actuator should be raised or lowered. Then, the electrical control current, with the result of the calculations and determination, is generated by the microprocessor and sent to the actuator.

Various rotary electrically actuated devices for regulating fluid flow, such as air/fuel mixture or pure air, have been provided in the art. These electrically actuated devices receive an electrically control current determined from various engine operating parameters and act like a valve regulating the fluid flow supplied to the engine. Oftentimes, these devices are complicated in structure which includes a lot of components and is often difficult to manufacture. As a result, these devices are often very expensive. In addition, due to the complexity of the structure, performances of the device are often not very satisfied. One of the main performances is to maximize a rotating range of a fluid flow plate while minimizing the package size of the actuator, so that the regulating range of the actuator is maximized while minimizing the package size of the actuator. The physical size of the conventional devices which can obtain the same angular displacement is often about two times of the physical size of the present invention. Another performance is to linearize the current-load curve, the input-output curve of the fluid flow metering system. The current-load curve characterizes the regulation performance of the actuator. The more linear the curve is, the better the regulation of the fluid flow is. The current-load curve of these conventional devices is not linear so that the regulation performance is not very satisfied.

Therefore, there is a need for an electrically controlled actuator which has a simple structure thus less expensive and has better performance with ensured durability and reliability.

SUMMARY OF THE INVENTION

The present invention relates to a fluid flow metering device, more particularly, to an electrically controlled actuator which is integrated into a valve body, such as a carburetor body or a throttle body of an internal combustion engine or other like applications.

In one embodiment of the present invention, the actuator comprises:

- a rotor, detachably mounted on a rotating shaft through a center bore of the rotor, having at least two symmetric curved outer surfaces, at least two side surfaces, and at least two symmetric tips extended from the curved outer surfaces at two leading edges of the rotor;
- a stator, disposed around the rotor, having at least two symmetric curved inner surfaces corresponding to the curved outer surfaces of the rotor, an air gap being defined between the inner surfaces of the stator and the outer surfaces of the rotor;
- a fluid flow plate being mounted on the rotating shaft, so that the fluid flow plate rotates with the rotor, the plate being further disposed in a fluid passageway, so that the plate closes the fluid passageway when the rotor is in an unactuated position, and the plate opens the fluid passageway when the rotor is in an actuated position; and
- a spiral spring being detachably mounted on one end of the rotating shaft proximate to the rotor, the spring being increased in tension when the rotor rotates from the unactuated position to the actuated position, the spring opposing rotation of the rotor, so that the rotor is forced to rotate back to the unactuated position by the spring when the actuator is unactuated.

One advantage of the present invention is that the structure of the actuator is much more simple, and there are only a few parts in the actuator.

Still in one embodiment, the rotating shaft has a cylindrical shape and includes means for positioning the rotor on the shaft both axially and rotationally. The center bore of the rotor has a locating feature, such as a locating mark, etc., so that the rotor is slid on the shaft only in one direction. Since the leading edge of the rotor is chamfered, one advantage of having the locating feature is that it is easy to assemble the rotor on the shaft.

Further in one embodiment, an angle between the unactuated position and the fully opened position of the fluid flow plate is about 75°. It is due to the extended tips at the leading edges which, in conjunction with a varying air gap, give the actuator extra angular displacement, therefore, the actuator has more regulating range for its size than the prior art.

Yet in one embodiment, the actuator further comprises electrical input and output ports for conducting an electrical control current to actuate or unactuated rotation of the rotor, and a bobbin assembly. An electrical wire is wound around the bobbin assembly. The bobbin assembly is mounted between two poles of the stator. The electrical wire has two ends which are disposed at the input port and the output port of the actuator.

Still in one embodiment, one end of the spiral spring is detachably mounted on the bobbin assembly, and the other end of the spiral spring is bent to detachably mount proximate a first end of the rotating shaft. The shaft retains the other end of the spring by a press fit which gives positive assembly feedback and retains the spring from interfering with the rotor or falling off from the shaft. Thus, only one spring is required to create a torque which is used to balance with the magnetic torque caused by the electrical control current. In addition, the air gap between the inner surfaces of the stator and the outer surfaces of the rotor becomes smaller when the rotor moves into a space which is defined between two poles of the stator, and the air gap becomes larger when the rotor moves out of the space defined between the two poles of the stator. The spiral spring and the non-uniform air gap help linearize the current-load curve.

Further in one embodiment, the stator includes means for mounting the stator to a valve body, such as a carburetor body or a throttle body, which defines the fluid passageway. The mounting means includes a plurality of screw captive slots disposed on an outer surface of the stator, and a plurality of screws are received in the screw captive slots. One end of each of the screws is secured into the valve body. A main body of the screw is received into each of the screw captive slots. The other end of the screws has a flat end to tightly press the stator onto the valve body. The mounting means further includes a recess portion which is disposed on the outer surface of the valve body and a projecting portion which is extended out of two poles of the stator. While assembling, the projecting portion of the stator is lined up with the recess portion of the valve body. Accordingly, it is easy to align the stator to the valve body in the assembly. Furthermore, the mounting means substantially eliminates the relative movements between the valve body and the stator.

Still in one embodiment, the actuator includes means for securing the rotor onto the rotating shaft. The securing means includes a push-on stud receiving clip. The securing means prevents the rotor from falling off from the rotating shaft when the rotor rotates.

Yet in one embodiment, there are at least two sets of bearings disposed between the rotating shaft and the valve body. One set of the bearings are disposed in the valve body closer to the rotor, and the other set of the bearings are disposed in the valve body away from the rotor. The bearings keep a uniform friction dampening so as to provide a repeatable, reliable governing control. Further, the bearings are sealed ball bearings. The seal is to prevent air entrance that would adversely effect the air/fuel ratio, or the air amount, or the other types of fluid amount. Furthermore, radial ball bearings are preferably used because of their ability to withstand the shaft deflections and corrosion by gas and oil.

Further in one embodiment, a microprocessor is used to generate an electrical control current for the actuator to control the engine speed. The microprocessor generates the electrical control current according to a voltage signal of a generator. The frequency of the voltage signal is proportional to the engine speed, so that the engine speed is sensed, sent to the microprocessor, and is consequently controlled by the actuator.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

Other aspects and advantages of the present invention may become apparent upon reading the following detailed and upon reference to the drawings. In the drawings in which like reference numerals and letters generally indicate corresponding parts throughout the several views.

DETAILED DESCRIPTION OF THE PREFERRED EMBODIMENT

The present invention illustrates an electrically controlled actuator. This design has a wide variety of applications in electro-magnetic control devices which have the similar problems.

Figure 1:
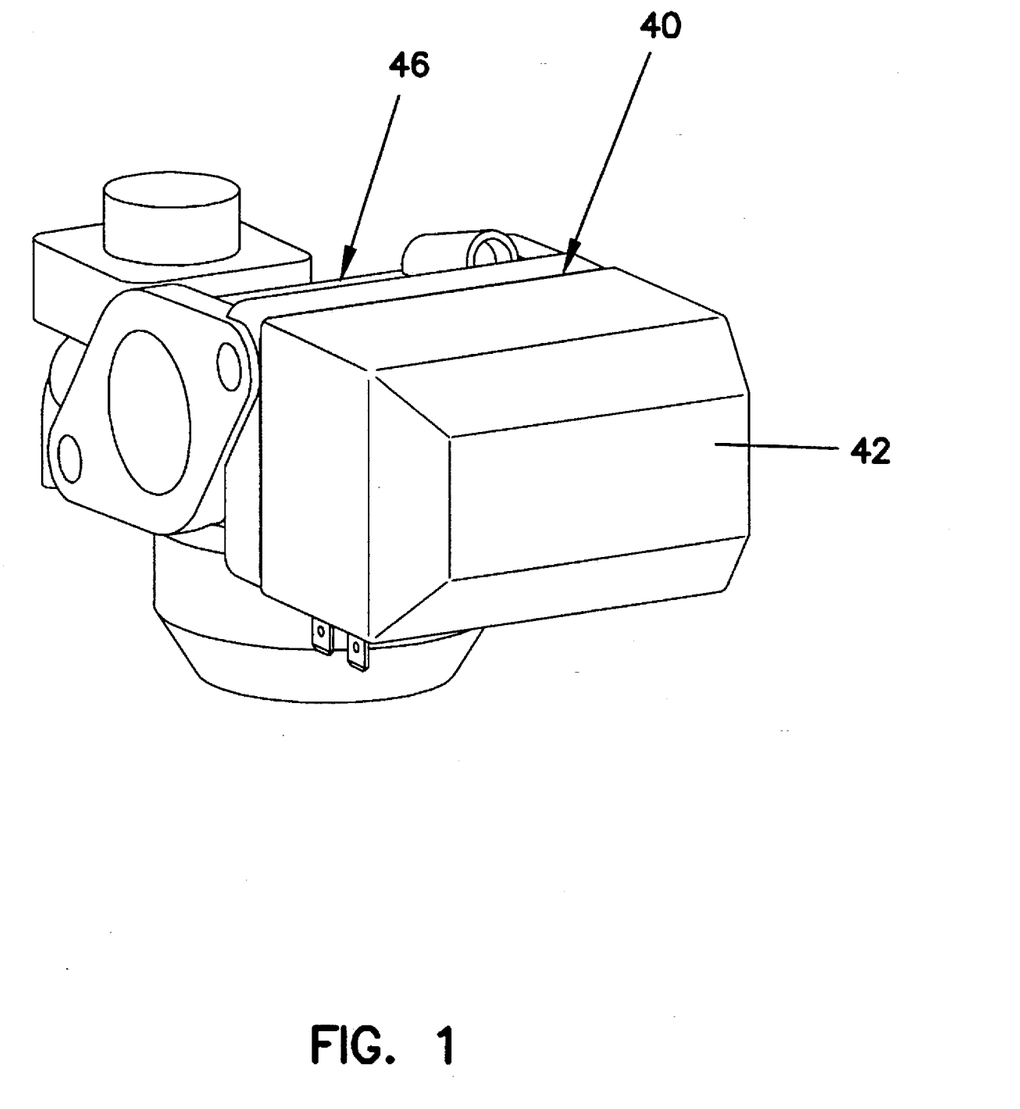
FIG. 1 is a perspective view of an electrically controlled actuator in accordance with the principles of the present invention.

FIG. 1 illustrates a perspective view of an electrically controlled actuator 40 in accordance with the present invention. Part of the actuator 40 is covered by a cover 42 so as to prevent dirt or particles, such as metal particles, from degrading the actuator performance by entering some air gaps.

Figure 2:
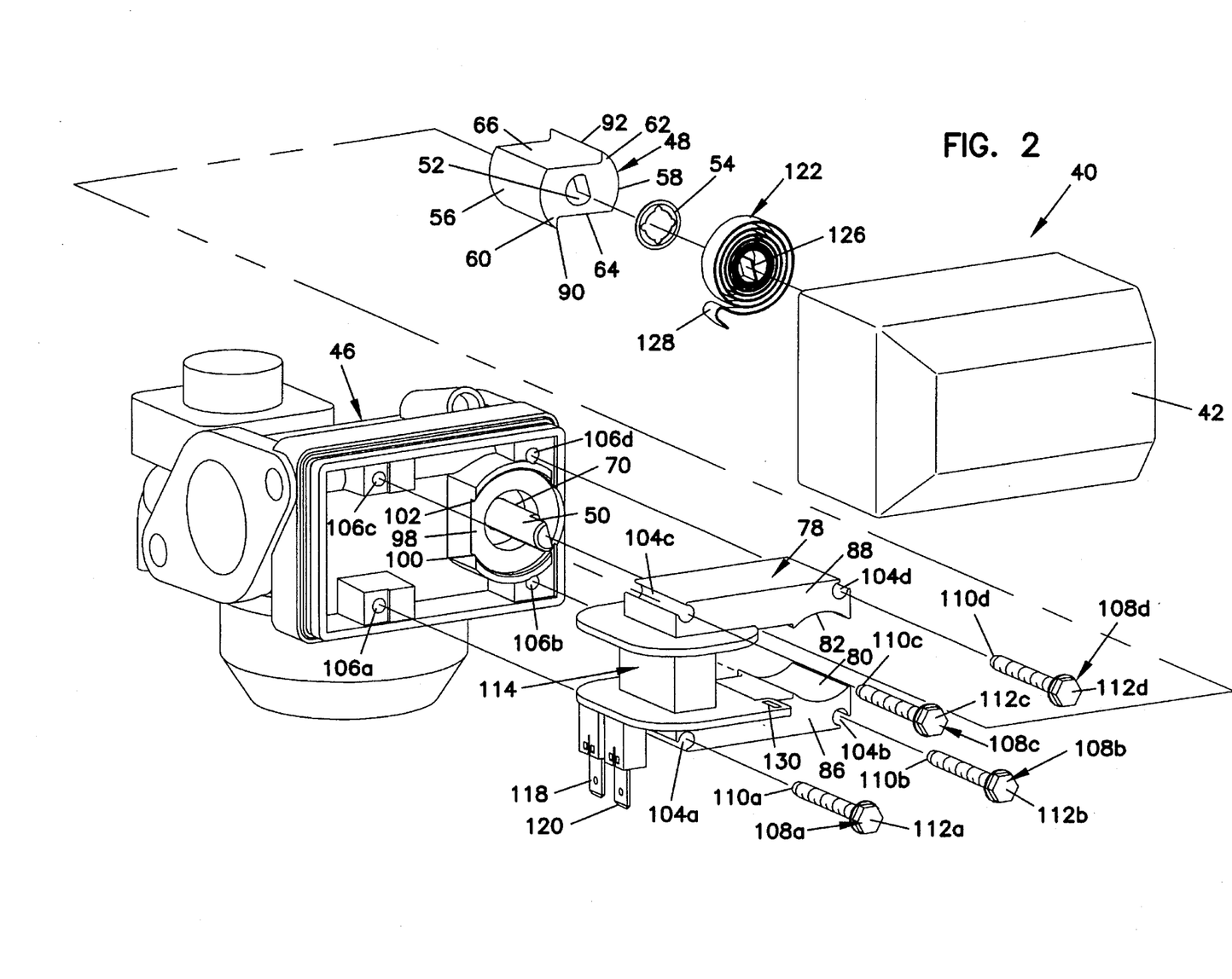
FIG. 2 is an exploded view of the electrically controlled actuator shown in FIG. 1.

FIG. 2 shows an exploded view of the electrically controlled actuator 40 shown in FIG. 1. A rotor 48 is detachably mounted on a rotating shaft 50 through a bore 52 of the rotor 48. The rotating shaft 50 is supported on a valve body 46 by a plurality of bearings (see details below in FIG. 13). The valve body 46 can be a carburetor body or a throttle body of an internal combustion engine. It is appreciated that any other types of valve body can be used to incorporate with the actuator 40. The rotor 48 is secured on the rotating shaft 50 by a push-on stud receiving clip 54. It is appreciated that other types of securing means can be used to secure the rotor 48 on the rotating shaft 50. Thus, the clip 54 prevents the rotor 48 from sliding off from the rotating shaft 50 when the rotor 48 rotates.

Figure 7:
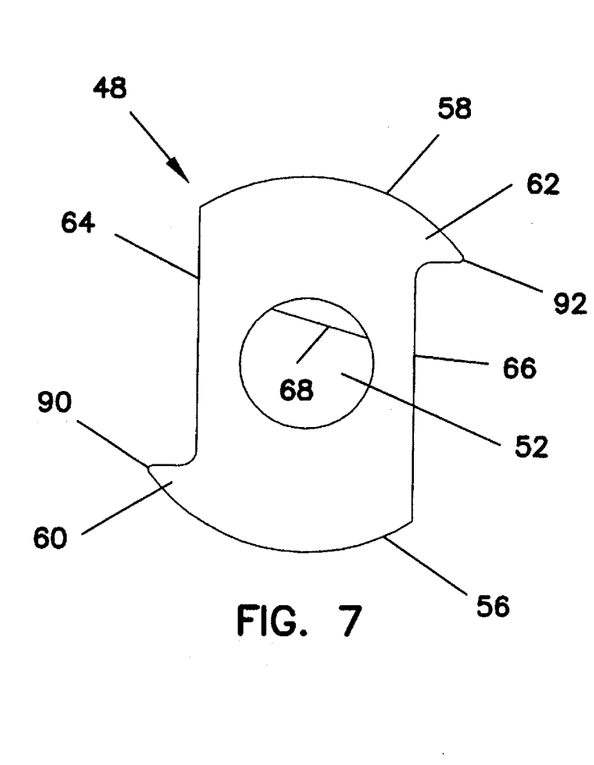
FIG. 7 is an enlarged side view of a rotor of the electrically controlled actuator.

In both FIGS. 2 and 7, it is shown that the rotor 48 has two symmetric curved outer surfaces 56, 58. Two symmetric tip portions 60,62 extended from the curved outer surfaces 56,58 beyond two side surfaces 64,66. The bore 52 is disposed proximate to the central of the rotor 48. The bore 52 has a flat surface 68 (see FIG. 7) which contacts with a corresponding flat surface 70 (see FIG. 5) of the rotating shaft 50. The rotor 48 is stopped from moving further toward a back end 72 of the rotating shaft 50 due to a wall created between the flat surface 70 and a flat surface 74 of the shaft 50. The clip 54 press-fits on a flat surface 76 of the shaft 50 so as to secure the rotor 48 onto the shaft 50.

Still in FIG. 2, a stator 78 is detachably mounted on the valve body 46. The stator 78 is disposed around the rotor 48. Two symmetric curved inner surfaces 80,82 correspond to the curved outer surfaces 56,58 of the rotor 48. An air gap 84 (see FIG. 3) is defined between the inner surfaces 80,82 of the stator 78 and the outer surfaces 56,58 of the rotor 48. The curved outer surface 56,58 and the tip portions 60,62 are disposed outside the space between two poles 86,88 of the stator 78 when the actuator 40 is in an unactuated position (see FIG. 11). The tip portions 60,62 start to move into the space between the poles 86,88 when the actuator 40 is actuated due to the magnetic torque created between the rotor 48 and the stator 78. Accordingly, edges 90,92 at the tip of the tip portions 60,62 are often called a leading edge as the edges 90,92 lead the curved outer surfaces 56,58 into facing with the curved inner surfaces 80,82 of the stator 78. The tip portions 60,62 increase the pole face between the stator 78 and the rotor 48 so that the rotation angle of the rotor 48 relative to the stator 78 is increased by an angle defined between the leading edge 90 (or 92) and the side surface 64 (or 66). The maximum rotation angle of the rotor 48 relative to the stator 78 is about 75°–78°. As a result, the rotating shaft 50 can be rotated at maximum about 75°–78°.

Figure 9:
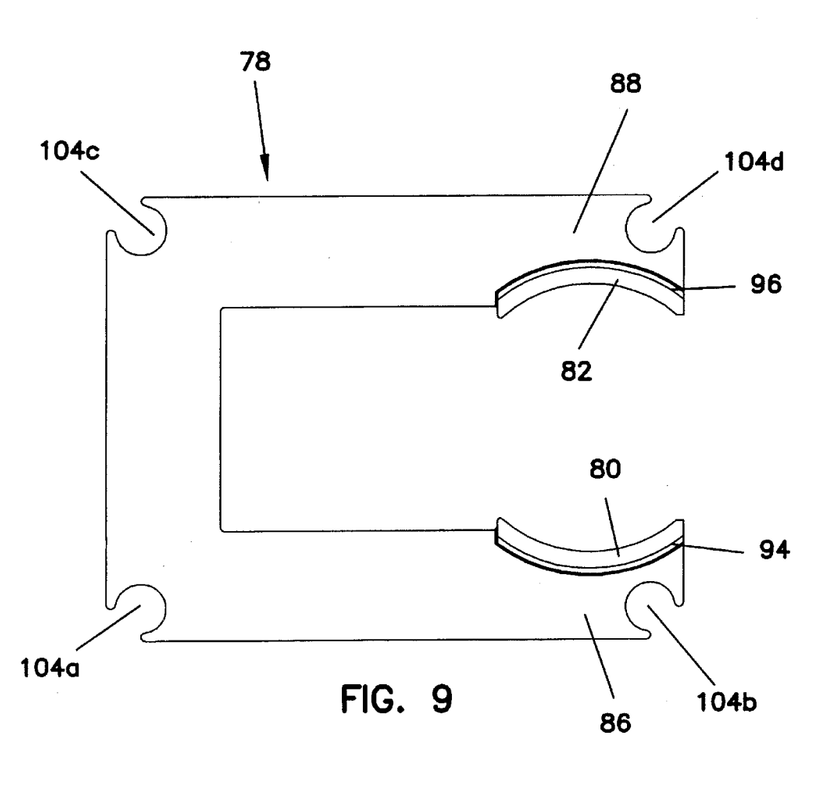
FIG. 9 is an enlarged side view of a stator of the electrically controlled actuator.
Figure 10:
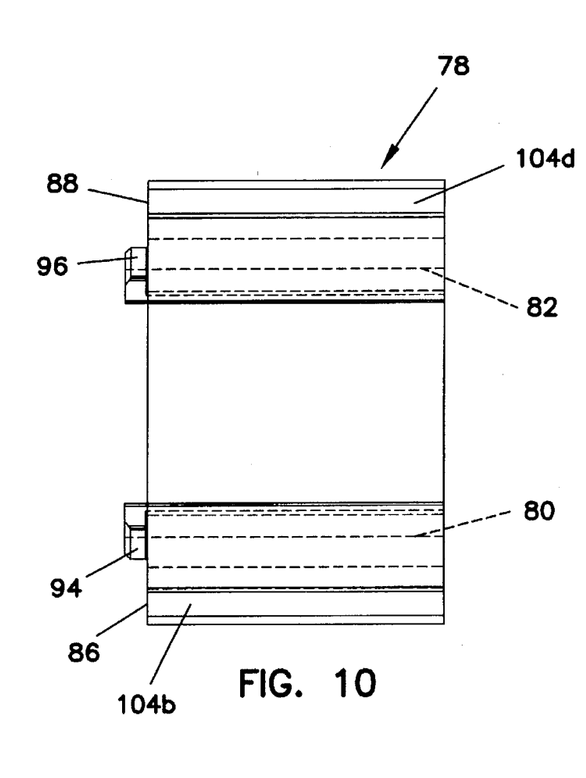
FIG. 10 is an elevation side view of the stator shown in FIG. 9.

The stator 78, as shown in FIGS. 2, 9, and 10, is disposed as a horizontal U-shaped stator. The stator 78 has two projection portions 94,96 extending from the poles 86,88, respectively. The two projection portions 94,96 are received in a recess 98 disposed on the valve body 46. The stator 78 and the valve body 46 are aligned to each other when the outer surfaces of the projection portions 94,96 are lined up and contact the walls 100,102 around the recess 98. In addition, the stator 78 has four screw captive slots 104a–d. The screw captive slots 104a–d are disposed on four corners of the U-shaped stator 78. When the stator 78 is aligned to the valve body 46, the four slots 104a–d are aligned to four mounting recesses 106a–d. Four screws 108a–d are disposed in the slots 104a–d. One end 110a–d of the screws 108a–d are secured in the mounting recesses 106a–d, and the other end 112a–d of the screws 108a–d have a cap-shape which is used to press the stator 78 toward the valve body 46 so as to tightly secure the stator 78 onto the valve body 46.

A bobbin 114 is mounted on the stator 78 between the two opposite arms of the U-shape. An electrical wire (not shown) is wound around the bobbin 114. The electrical wire conducts an electrical control current from a microprocessor 116 (see FIG. 15) via input and output ports 118,120 of the actuator 40. The electrical current is converted to the magnetic torques so as to rotate the rotor 48. The magnetic torques are varied according to the different electrical currents thus causing various rotation angles.

Figure 3:
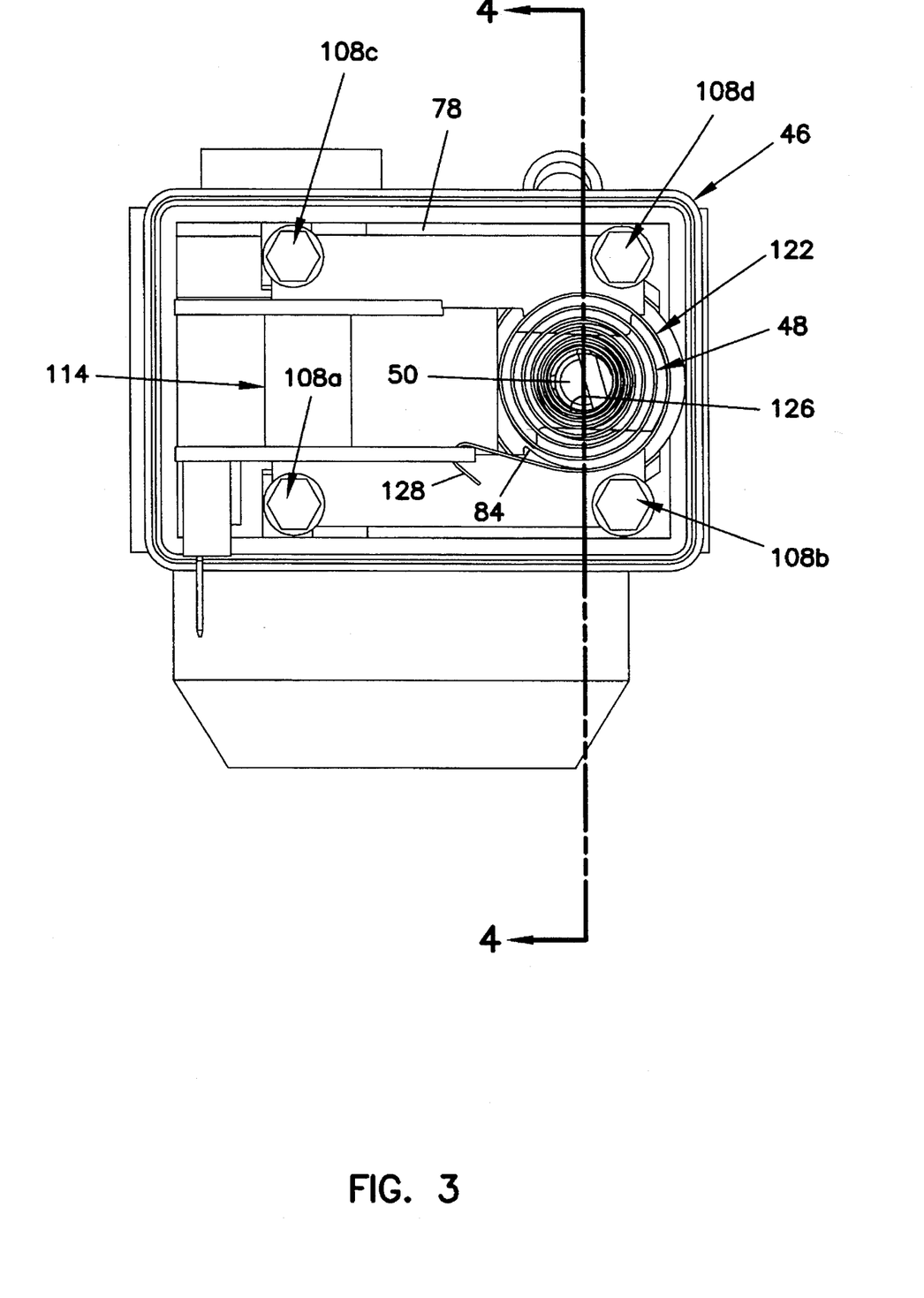
FIG. 3 is an elevation side view of the electrically controlled actuator having a cover being removed.
Figure 5:
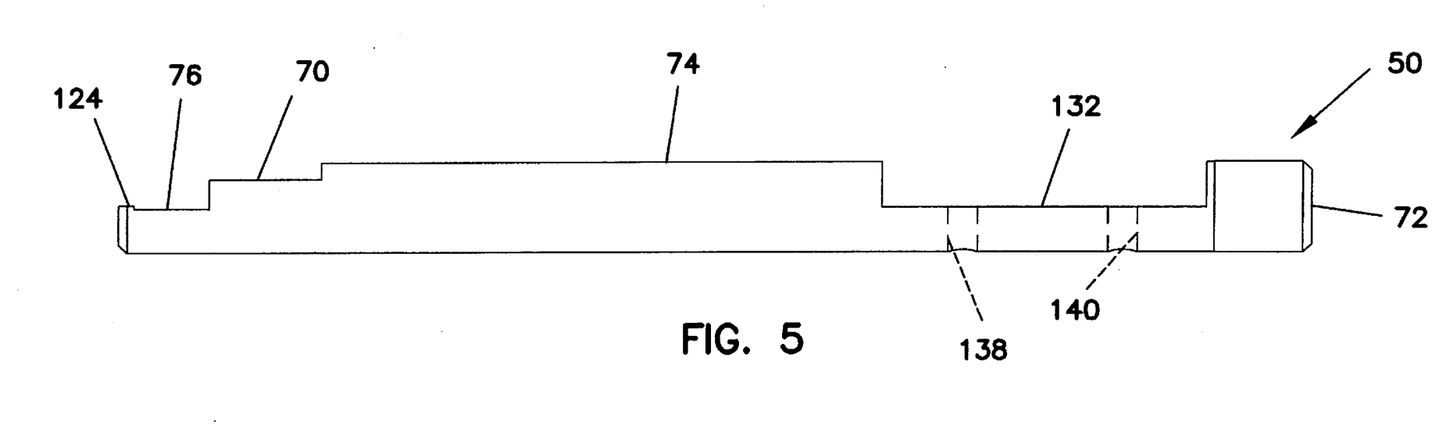
FIG. 5 is an enlarged side view of a rotating shaft of the electrically controlled actuator.

In FIGS. 2 and 3, a spiral spring 122 is detachably mounted on the rotating shaft 50, between the clip 54 and a projection section 124 of the shaft 50 (see FIG. 5). An inner end portion 126 of the spring 122 is bent to a flat shape. The inner end portion 126 is thus biasedly passed through the projection section 124 and is received in the lower surface 76 of the shaft 50. An outer end portion 128 of the spring 122 is bent 180° to form a C-shape. The outer end portion 128 hocks into a slot 130 disposed on the bobbin 114. Accordingly, when the rotor 48 rotates under the stator 78, the spring 122 is biasedly extended and increased in tension. The spring has the tendency to counter-rotate the rotor 48. Thus, the rotor 48 rotates to a position where the torque created by the spring tension force balances with the magnetic torques and other shaft torques created by the application or system. It is appreciated that another types of tension means can be used to balance the magnetic torques and other shaft torques created by the application or system.

The air gap 84 (see FIG. 3) between the curved inner surfaces 80,82 of the stator 78 and the curved outer surfaces 56,58 of the rotor 48, when the rotor 48 moves under the stator 78, is not uniform. The air gap 84 becomes smaller when the curved outer surfaces 56,58 of the rotor 48 move into the space between the poles 86,88 of the stator 78, and the air gap 84 becomes larger when the curved outer surfaces 56,58 of the rotor 48 move out of the space between the inner surfaces 80,82 of the poles 86,88 of the stator 78. The smaller the gap is, the denser the magnetic flux is, so that the torques created from the additional magnetic flux due to the smaller gap compensate the unbalanced torques created during the rotation of the rotor 48. Accordingly, the current-load curve, which shows the relationship between the input, electrical currents, and the output, fluid control, is still substantially linear.

In FIG. 3 shows an elevation side view without the cover 42. The screws 108a–d tightly secure the stator 78 onto the valve body 46. The spring 122 is attached to the rotating shaft 50 at the inner end portion 126 and is attached to the bobbin 144 at the outer end portion 128.

Figure 4:
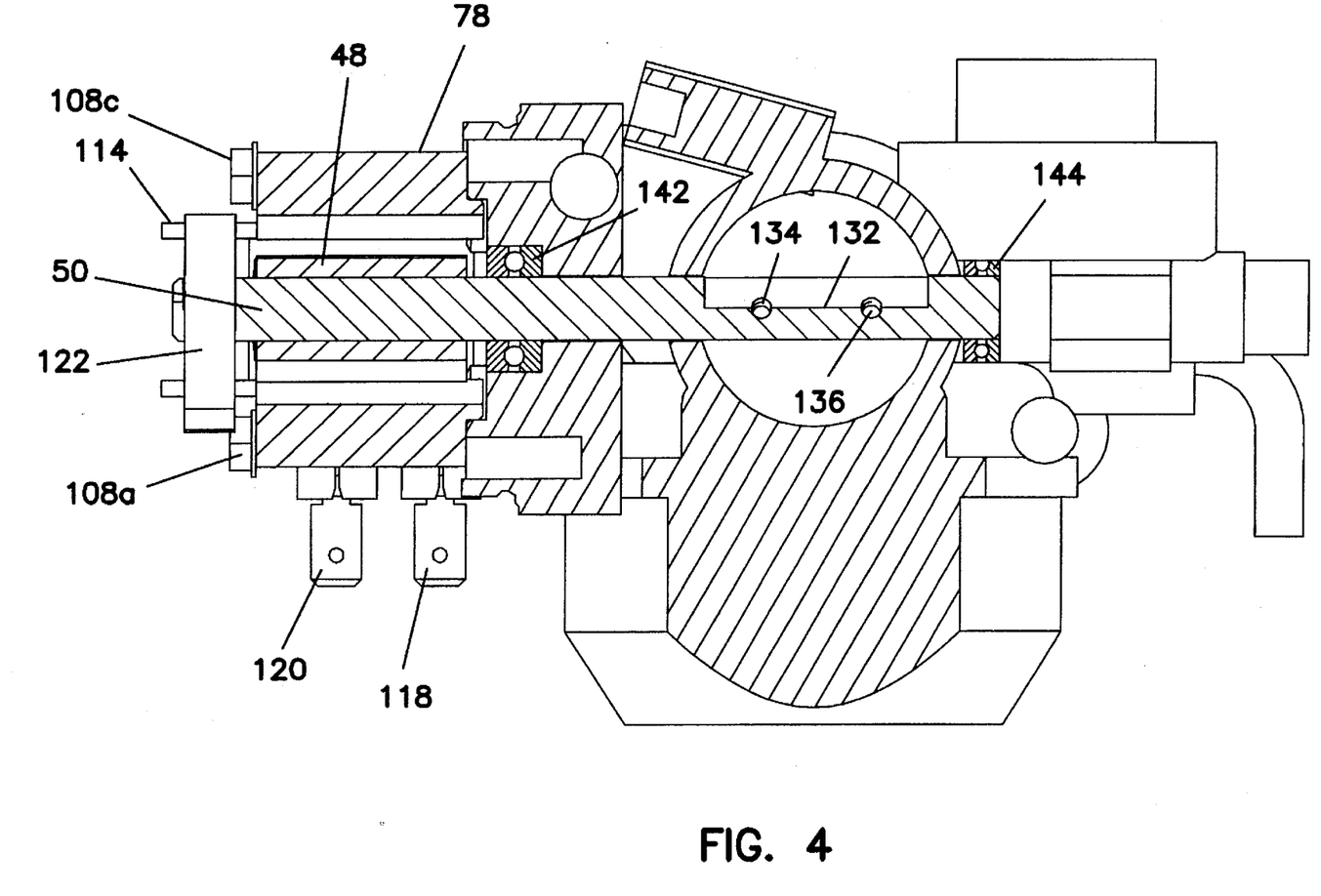
FIG. 4 is a cross-sectional view, along a line 4—4 of FIG. 3, of the electrically controlled actuator.
Figure 11:
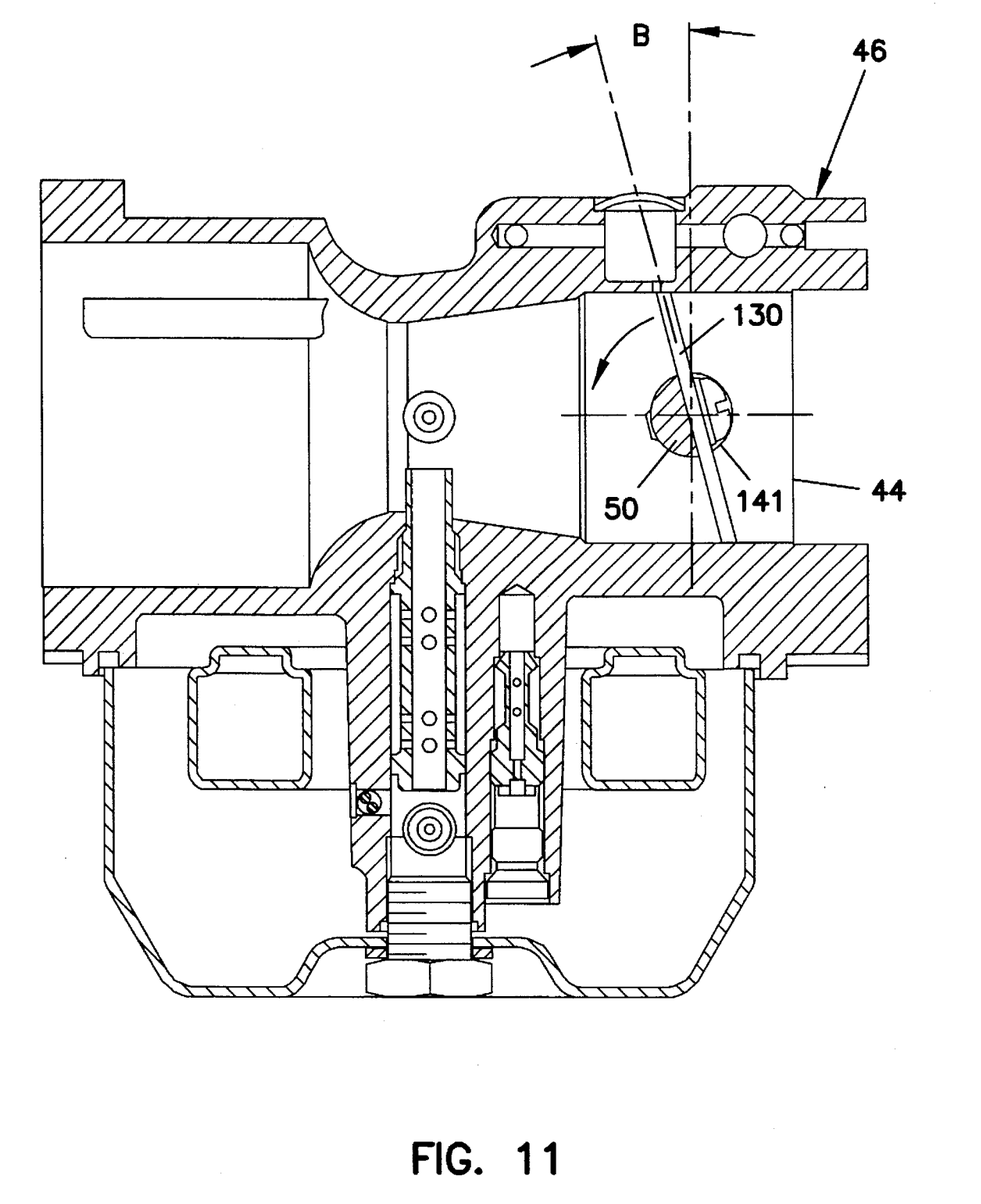
FIG. 11 is a cross-sectional view along the line X—X shown in FIG. 4 where the electrically controlled actuator is in an unactuated position.
Figure 12:
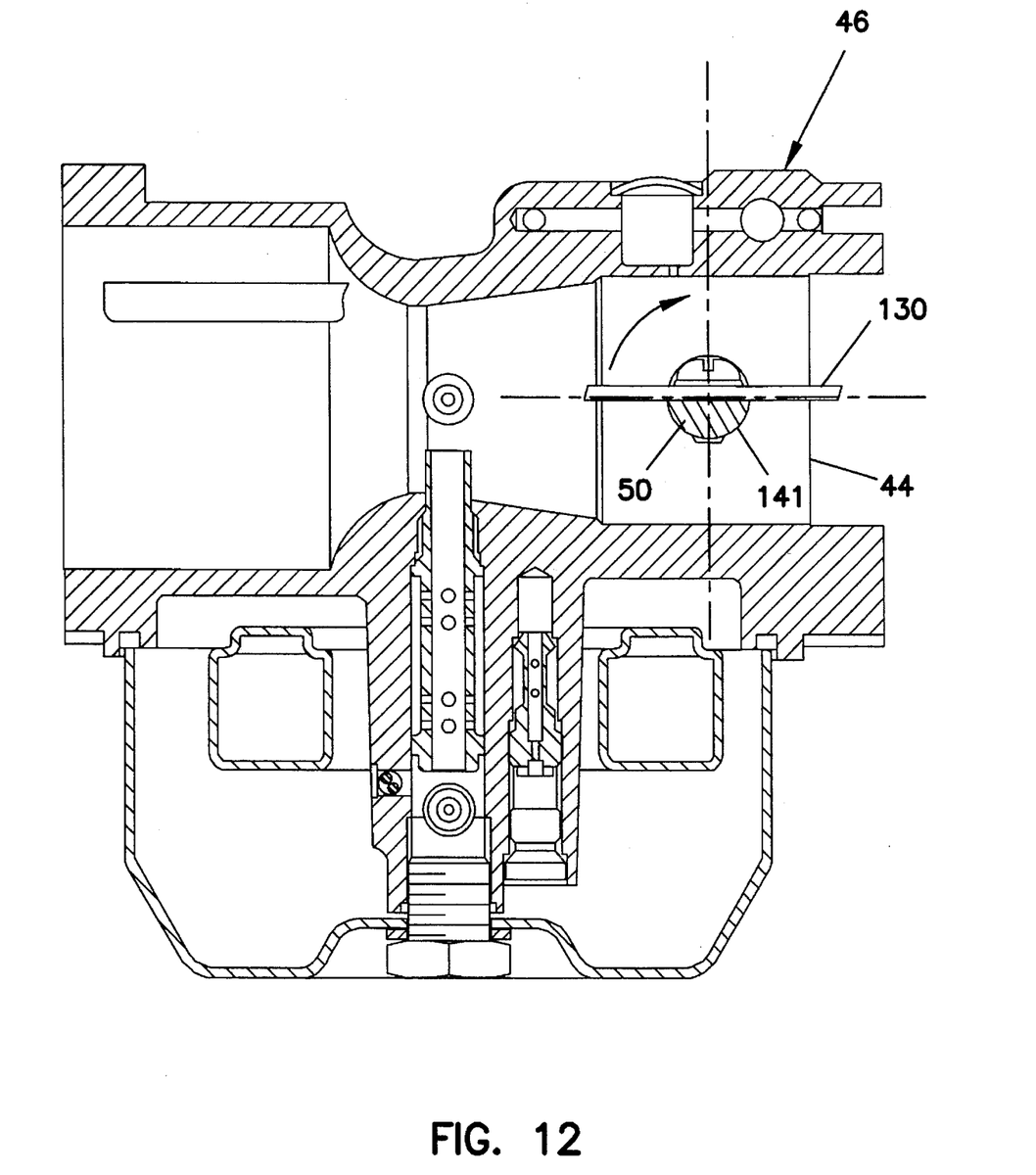
FIG. 12 is a cross-sectional view along the line X—X shown in FIG. 4 where the electrically controlled actuator is in a fully actuated position.

In FIG. 4, a fluid flow plate 130 (see FIGS. 11 and 12) is mounted on the rotating shaft 50 at a reduced section 132 (also see FIG. 5) via two mounting screws 134,136. The mounting screws 134,136 are received in two screw slots 138,140 on the shaft 50, respectively. Thus, the plate 130 rotates with the rotating shaft 50. The plate 130 closes a fluid passageway 44 (see FIGS. 11–13) when the actuator 40 is not actuated. As also shown in FIG. 11, where the actuator 40 is in an unactuated position, the plate 130 has a predetermined tilt angle, β, e.g. 15°, from a vertical line as shown in FIG. 11. The tilt angle β can be varied as desired. For example, if the maximum rotating angle of the plate between the unactuated position and the full open position (i.e. the plate parallel to the fluid flow, as shown in FIG. 12) is 75°, then the tilt angle β can be set to 15°.

Figure 13:
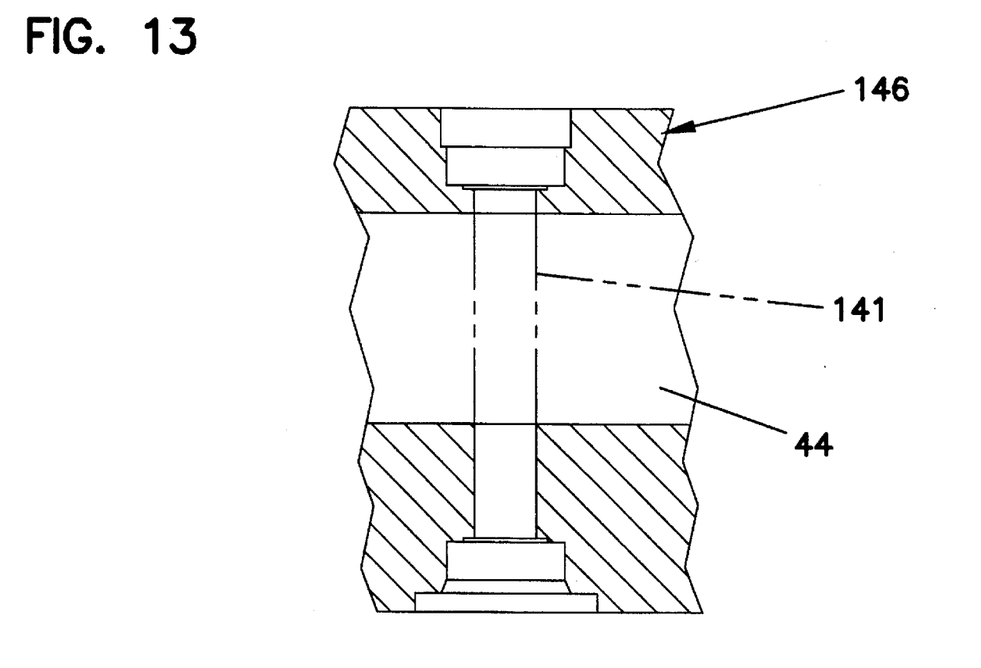
FIG. 13 is a cross-sectional view of bearings along a longitudinal axis of the rotating shaft.

In FIG. 13, a longitudinal bore 141 of the valve body 46 is shown. The rotating shaft 50 is substantially disposed and fits in the bore 141. The longitudinal bore 141 intersects the fluid passageway 44. The fluid flow plate 130 is disposed at the intersection, so that the fluid flow plate 130 closes or opens the fluid passageway 44 when the rotating shaft 50 rotates with the fluid flow plate 130. The rotating shaft 50 is held in place by two sets of sealed ball bearings 142,144 (FIG. 4). One set of the ball bearings 142 is disposed between the rotating shaft 50 and the valve body 46 closer to the rotor 48. The other set of the ball bearings 144 is disposed between the shaft 50 and the valve body 46 at the back end 72. The ball bearings 142,144 are sealed from outside to prevent air entrance that would adversely effect the fluid conducted in the fluid passageway 44. For example, the air may change the air/fuel ratio in a carburetor application or may change the existing air amount in a throttle body application. The bearings 142,144 can also reduce the deflection of the rotating shaft 50 during the rotation. In addition, the bearings 142,144 absorb any deflection which may occur without introducing any inconsistent friction to the actuator 40.

The deflection of the shaft 50 can further be reduced by the line up between the projecting portions 94,96 and the recess walls 100,102.

The stator 78 and the rotor 48 are made of powdered metal which comprises of a 7.0 g/cc minimum density nearly carbon free material and 0.45% phosphorus. It is appreciated that other type of components can be used in place of the powdered metal.

Figure 6:
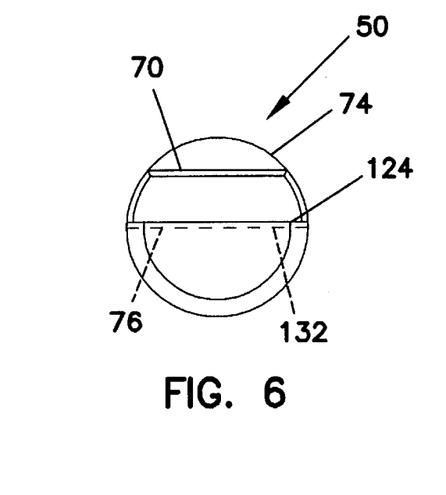
FIG. 6 is an elevation side view of the rotating shaft shown in FIG. 5.

FIG. 6 shows the shaft 50 in an elevation side view of FIG. 5.

Figure 8:
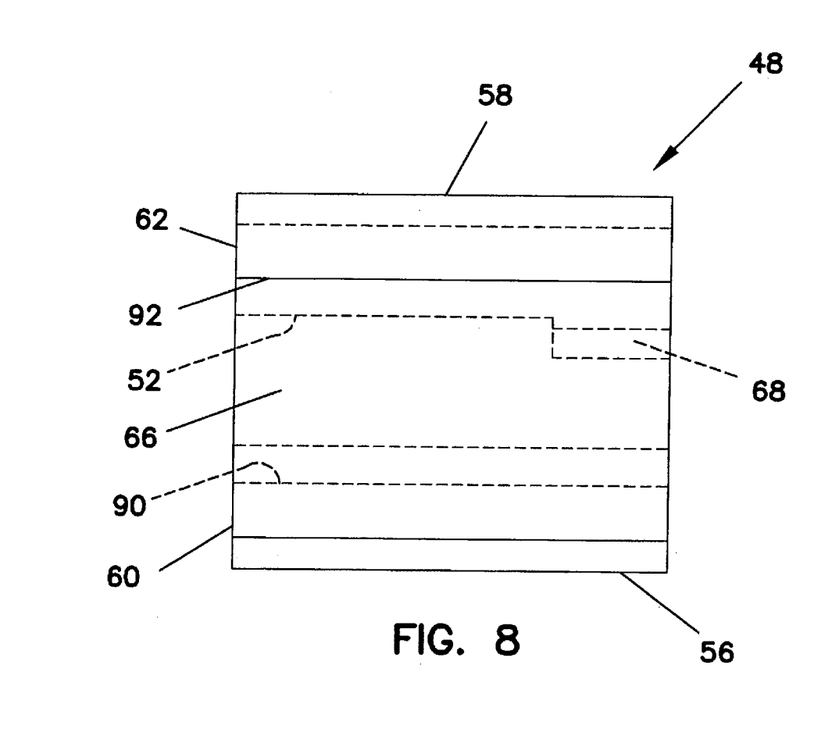
FIG. 8 is an elevation side view of the rotor shown in FIG. 7.

FIG. 8 is an elevation side view of the rotor 48 as shown in FIG. 7.

FIG. 10 is an elevation side view of the stator 78 as shown in FIG. 9.

Figure 14:
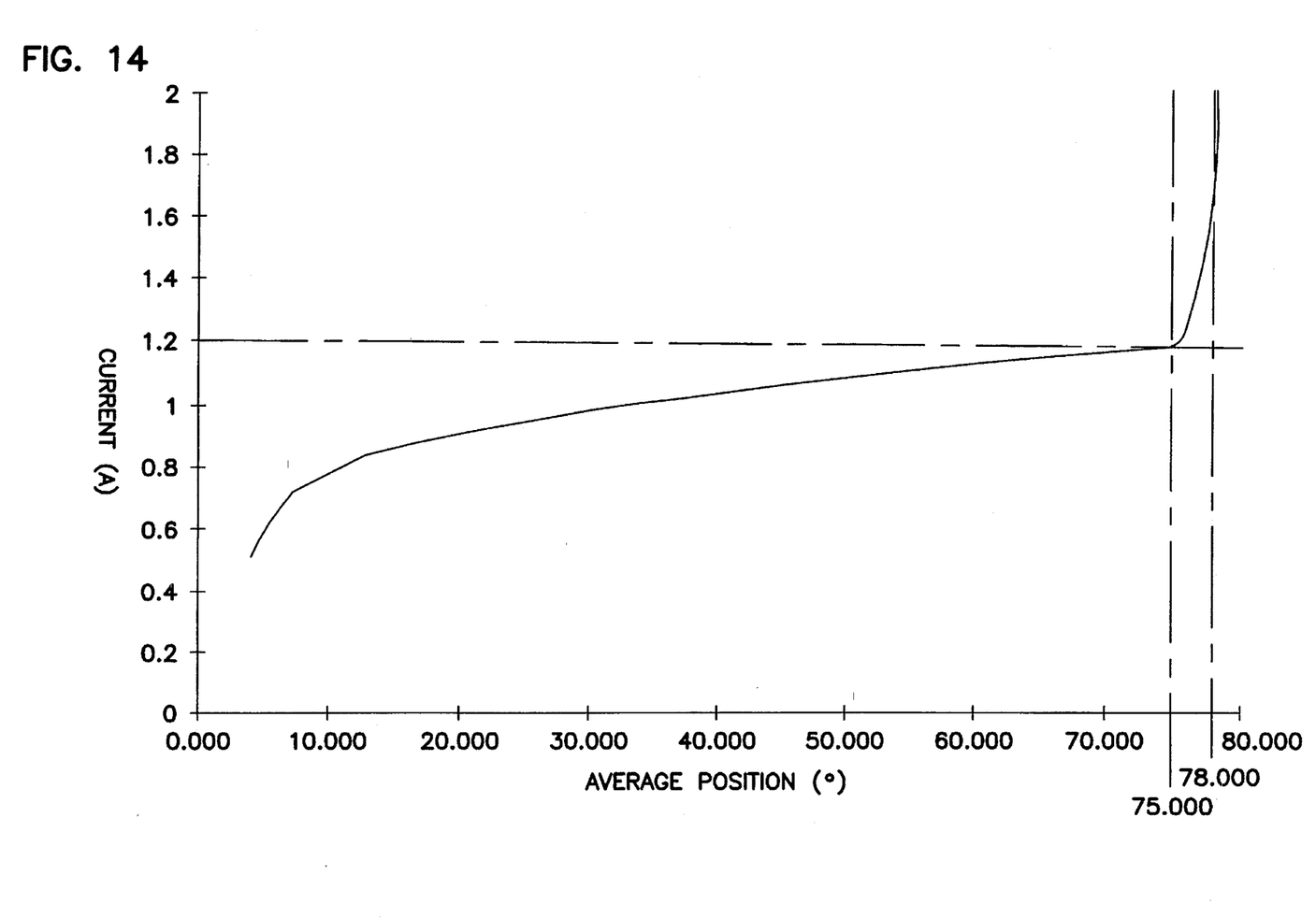
FIG. 14 is a schematic view of a current-rotating angle curve of the electrically controlled actuator in accordance with the present invention.

In FIG. 14, a current-rotating angle curve of the present invention is shown. When the control current is above a certain amount, such as 1.2 Amp, the curve becomes linear so that a good control performance to control the rotation of the fluid flow plate is provided. It is also shown that the maximum rotating angle, the angle between the unactuated position and the fully opened position of the fluid flow plate, is about 75° to 78°.

Figure 15:
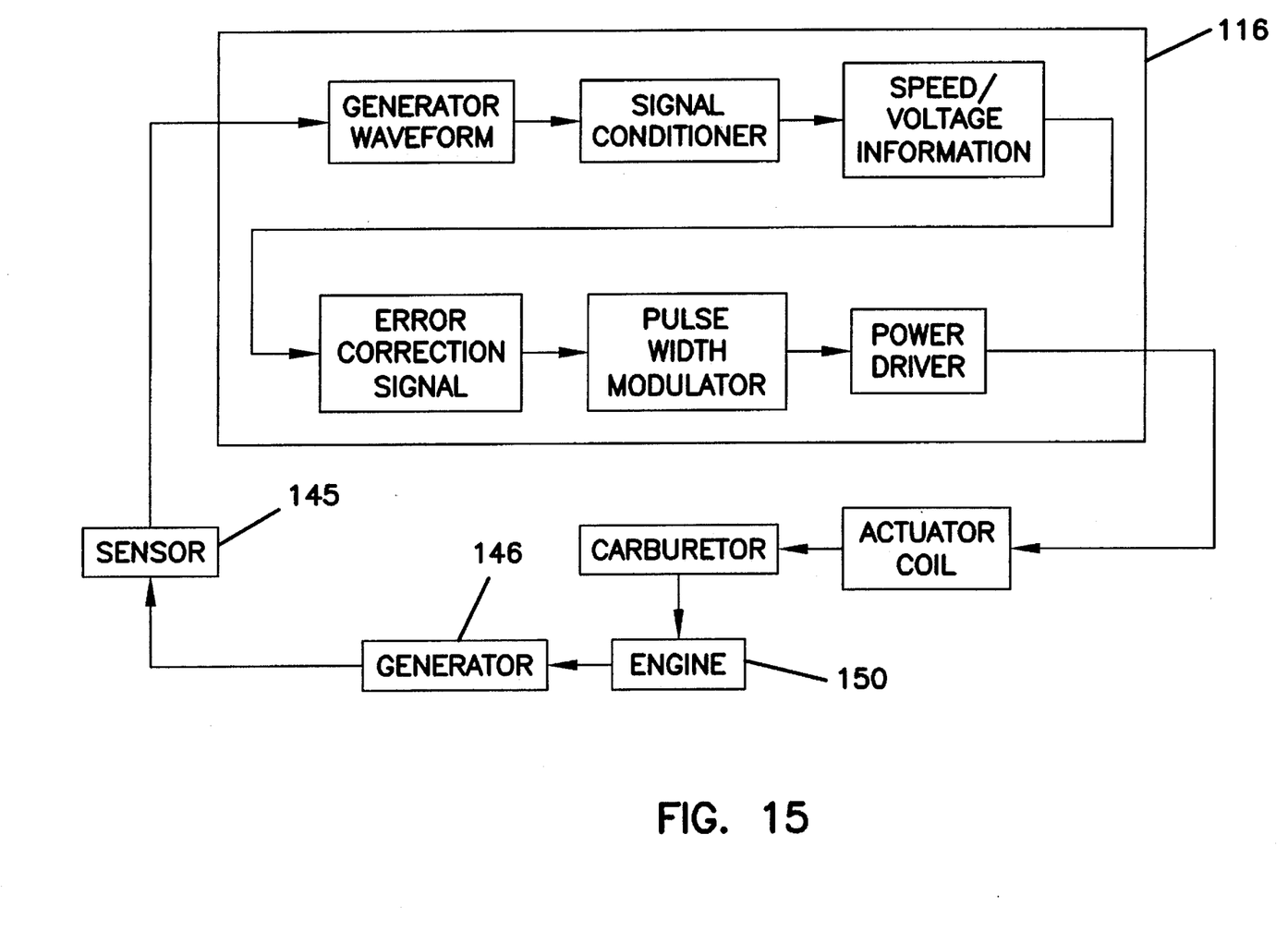
FIG. 15 is a block diagram of a control device associated with the electrically controlled actuator used in an internal combustion engine.

FIG. 15 shows an electrical control device incorporated with the actuator 40. The electrical control device, such as a microprocessor 116, sends the electrical control current to the input port 118 of the actuator 40. The microprocessor 116 receives a signal from a sensor 145. The sensor senses an engine speed by sensing a voltage output of a generator 146 as shown in FIG. 15. The sensed signal from the sensor 145 is sent to the microprocessor 116. It is appreciated that other methods of detecting the engine speed can be used.

After the sensed signal is sent to the microprocessor 116, calculations are made to do corrections in the electrical control current which is sent to the actuator 40. The correction determines whether the current is to be raised or lowered. The greater the control current, the more magnetic torque is produced, and the more rotating angle is turned. For example, the sensor 146 senses the engine speed and sends it to the microprocessor 116. The microprocessor 116 determines the correction and sends the proper amount of current to the input port 118 of the actuator 40 to more open or more close the fluid passageway 44 so as to regulate the amount of fluid supplied to an engine 150.

A software is installed in the microprocessor 116, which includes an algorithm to determine the amount of control current sent to the actuator 40 according to the sensed engine speed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electrically controlled actuator, comprising:
    a rotor, detachably mounted on a rotating shaft through a center bore of the rotor, having at least two symmetric curved outer surfaces, at least two side surfaces, and at least two symmetric tip portions extended from the curved outer surfaces at two leading edges between the side surfaces and the curved outer surfaces;
    a stator, disposed around the rotor, having at least two symmetric curved inner surfaces corresponding to the curved outer surfaces of the rotor, an air gap being defined between the inner surfaces of the stator and the outer surfaces of the rotor;
    a fluid flow plate being mounted on the rotating shaft, so that the fluid flow plate rotates with the rotor, the plate being further disposed in a fluid passageway, so that the plate closes the passageway when the rotor is in an unactuated position, and the plate opens the passageway when the rotor is in an actuated position;
    a spiral spring being detachably mounted on one end of the rotating shaft proximate to the rotor, the spring being increased in tension when the rotor rotates from the unactuated position to the actuated position, the spring opposing rotation of the rotor, so that the rotor is forced to rotate back to the unactuated position by the spring when the actuator is unactuated; and
    wherein the stator includes means for mounting the stator to a valve body which defines the fluid passageway, the mounting means includes a plurality of screw captive slots disposed on an outer surface of the stator, and a plurality of screws received in the screw captive slots.

2. An electrically controlled actuator according to claim 1, further comprising:
    a bobbin assembly, the bobbin assembly being mounted on a section of the stator disposed between the two poles of the stator.

3. An electrically controlled actuator according to claim 2, wherein the rotating shaft has a cylindrical shape, the shaft including a flat section, the center bore of the rotor being chamfered and receiving the flat section of the shaft, so that the rotor slides on the shaft in one direction and is nonrotationally secured to the shaft.

4. An electrically controlled actuator according to claim 2, further comprising a maximum rotating angle defined between the unactuated position and the fully opened position of the plate, the maximum rotating angle is about 75° to 78°.

5. An electrically controlled actuator according to claim 1, wherein the bobbin assembly includes electrical wires, the electrical wires are wound around the bobbin assembly and lead an electrical control current into an electric input port of the actuator and out of an electric output port of the actuator.

6. An electrically controlled actuator according to claim 5, wherein one end of the spiral spring is detachably mounted on the bobbin assembly, and the other end of the spiral spring is bent to detachably mounted proximate a first end of the shaft proximate to the rotor.

7. An electrically controlled actuator according to claim 2, further comprising means for securing the rotor onto the shaft, the securing means including a push-on stud receiving clip.

8. An electrically controlled actuator according to claim 2, further comprising at least two sets of bearings acting on the rotating shaft, one set of the bearings being disposed close to the rotor, the other set of the bearings being disposed away from the rotor.

9. An electrically controlled actuator according to claim 2, wherein the air gap defined between the inner surfaces of the stator and the outer surfaces of the rotor becomes smaller when the rotor moves into a space defined between two poles of the stator, the air gap becomes larger when the rotor moves out of the space between the two poles of the stator.

10. An electrically controlled actuator according to claim 7, wherein one end of each of the screws is mounted into the valve body, a main body of the screw is received into each of the screw captive slots, and the other end of the screw has a flat end to secure the stator onto the valve body.

11. An electrically controlled actuator according to claim 1, wherein the mounting means further includes a recess portion casted in the valve body and a projecting portion projected along two poles of the stator, so that the projecting portion is aligned with the recess portion.

12. A fluid flow metering apparatus, comprising:

a body defining a fluid passageway;

a rotor, detachably mounted on a rotating shaft through a center bore of the rotor, having at least two symmetric curved outer surfaces, at least two side surfaces, and at least two symmetric tips extended from the curved outer surfaces at two leading edges between the side surfaces and the curved outer surfaces, the rotating shaft, mounted on the body, passing through the body and intersecting the fluid passageway;

a stator, disposed around the rotor, having at least two symmetric curved inner surfaces corresponding to the curved outer surfaces of the rotor, an air gap being defined between the inner surfaces of the stator and the outer surfaces of the rotor, the stator being mounted on the body;

a fluid flow plate being mounted on the rotating shaft, so that the plate rotates with the rotor, the plate being further disposed in the fluid passageway, so that the plate closes the passageway when the rotor is in an unactuated position, and the plate opens the passageway when the rotor is in an actuated position;

a spiral spring being detachably mounted on one end of the rotating shaft proximate to the rotor, the spring being increased in tension when the rotor rotates from the unactuated position to the actuated position, the spring opposing rotation of the rotor, so that the rotor is forced to rotate back to the unactuated position by the spring when the actuator is unactuated; and wherein the stator includes means for mounting the stator to the body which defines the fluid passageway, the mounting means includes a plurality of screw captive slots disposed on an outer surface of the stator, and a plurality of screws received in the screw captive slots.

13. A fluid flow metering apparatus according to claim 12, further comprising:

a bobbin assembly, the bobbin assembly being mounted on a section of the stator disposed between the two poles of the stator.

14. A fluid flow metering apparatus according to claim 13, wherein the rotating shaft has a cylindrical shape, the shaft including a flat section, the center bore of the rotor being chamfered and receiving the flat section of the shaft, so that the rotor slides on the shaft in one direction and is nonrotationally secured to the shaft.

15. A fluid flow metering apparatus according to claim 13, further comprising a maximum rotating angle defined between the unactuated position and the fully opened position of the plate, the maximum rotating angle is about 75° to 78°.

16. An electrically controlled actuator according to claim 13, wherein the bobbin assembly includes electrical wires, the electrical wires are wound around the bobbin assembly and lead an electrical control current into an electric input port of the actuator and out of an electric output port of the actuator.

17. A fluid flow metering apparatus according to claim 16, wherein one end of the spiral spring is detachably mounted on the bobbin assembly, and the other end of the spiral spring is bent to detachably mounted proximate a first end of the shaft proximate to the rotor.

18. A fluid flow metering apparatus according to claim 13, further comprising means for securing the rotor onto the shaft, the securing means including a push-on stud receiving clip.

19. A fluid flow metering apparatus according to claim 13, further comprising at least two sets of bearings acting on the rotating shaft, one set of the bearings being disposed closer to the rotor, the other set of the bearings being disposed away from the rotor.

20. A fluid flow metering apparatus according to claim 13, wherein the body is a carburetor body for an internal combustion engine.

21. A fluid flow metering apparatus according to claim 20, further comprising a sensor sensing a parameter of the internal combustion engine, and a microprocessor, the sensor sending an electrical signal to the microprocessor, the microprocessor generating an electrical control current which is converted to a magnetic torque by the rotor and stator so as to rotate the fluid flow plate.

22. A fluid flow metering apparatus according to claim 13, wherein the body is a throttle body for an internal combustion engine.

23. A fluid flow metering apparatus according to claim 22, further comprising a sensor sensing a parameter of the internal combustion engine, and a microprocessor, the sensor sending an electrical signal to the microprocessor, the microprocessor generating an electrical control current which is converted to a magnetic torque by the rotor and stator so as to rotate the fluid flow plate.

24. A fluid flow metering apparatus according to claim 13, wherein the body has an aligning portion concentric with the rotating shaft, the stator has an aligning portion corresponding to the aligning portion of the body.

25. A fluid flow metering apparatus according to claim 24, wherein the aligning portion of the body is a recess disposed on an outer surface of the body, the corresponding aligning portion of the stator is a projection disposed on an outer surface of the stator, the projection being fit in the recess.

26. A fluid flow metering apparatus according to claim 24, wherein the aligning portion of the body is a projection disposed on an outer surface of the body, the corresponding aligning portion of the stator is a recess disposed on an outer surface of the stator, the projection being fit in the recess.

27. A fluid flow metering apparatus according to claim 24, wherein the body is a carburetor body for an internal combustion engine.

28. A fluid flow metering apparatus according to claim 24, wherein the body is a throttle body for an internal combustion engine.

29. A fluid flow metering apparatus according to claim 12, wherein one end of each of the screws is mounted onto the body, a main body of the screws is received into each of the screws captive slots, and the other end of the screws has a flat end to secure the stator onto the body.

* * * * *